Feb. 8, 1966   J. C. WHITTINGHAM   3,233,296
BELT STORING BUCKLE
Filed Nov. 19, 1962   4 Sheets-Sheet 1

INVENTOR.
JOHN C. WHITTINGHAM
BY
Anderson, Spangler & Wymore
ATTORNEYS

Feb. 8, 1966  J. C. WHITTINGHAM  3,233,296
BELT STORING BUCKLE

Filed Nov. 19, 1962  4 Sheets-Sheet 3

INVENTOR.
JOHN C. WHITTINGHAM
BY
Anderson, Spangler & Seymour
ATTORNEYS

Feb. 8, 1966 J. C. WHITTINGHAM 3,233,296
BELT STORING BUCKLE
Filed Nov. 19, 1962 4 Sheets-Sheet 4

INVENTOR.
JOHN C. WHITTINGHAM
BY
Anderson, Spangler & Wymore
ATTORNEYS

United States Patent Office 3,233,296
Patented Feb. 8, 1966

3,233,296
BELT STORING BUCKLE
John C. Whittingham, Colorado Springs, Colo., assignor to Aircraft Mechanics, Inc., a corporation of Colorado
Filed Nov. 19, 1962, Ser. No. 238,460
1 Claim. (Cl. 24—78)

The present invention relates to buckles and more specifically to those buckles of the type adapted to fasten together the free ends of vehicle safety harness, such as a lap belt or shoulder strap.

The so-called "safety belt" has been an item of aircraft seat equipment since the advent of flying. Aircraft crew members and passengers alike have long been conditioned to the requirement for such apparatus and have come to consider the fastening of such a belt as one of the prerequisites to flight. Even though both ends of the belt are not easily located or they are twisted or have become fouled in the seat the aircraft passenger will usually make the necessary effort to get himself properly fastened into the seat. Unfortunately, however, the automobile passenger is, in general, not so dedicated to the advantages offered by being secured within the vehicle. Although it is a recognized fact that a safety harness is an asset to any person in a motor vehicle, the public has not been sufficiently conditioned to always wear the belt which may be provided. One of the reasons for such an attitude is the trouble and inconvenience caused by trying to extricate the buckle members from beneath oneself or from the cracks in the seat, straightening the belt and adjusting it to proper length.

The obvious answer to this problem has been furnished by others who have sought to retract the belt when not in use so as to clear the seats of the vehicle and position the buckle members for easy access the next time they are used. Most of these devices provide storage reels or other take-up systems which store the excess belting at the rear of or underneath the seat, and while the objective of the prior solutions is meritorious, the structure involved in accomplishing the end result is bulky and is difficult to install and as a result has largely defeated itself.

It is therefore an object of the present invention to overcome the disadvantages inherent in prior retractable seat belts by providing buckle means which, in addition to its fastening functions, will reel up and store excess belting.

In its fundamental aspects the buckle of the present invention includes a penetrating tongue and a cooperating latching mechanism which receives and holds the tongue, the former being attached to the free end of one belt and the latter being attached to the free end of the other belt. At least one of the buckle members contains a spring loaded drum onto which the belting is coiled and which is locked into fixed position by separate means when sufficient belting has been taken from the reel and the two belt members are joined in latching engagement with each other.

All of the objects, features and advantages of the present invention will become apparent from the following detailed description of a preferred and alternate embodiment of the invention taken in connection with the accompanying drawings in which.

Figure 1:
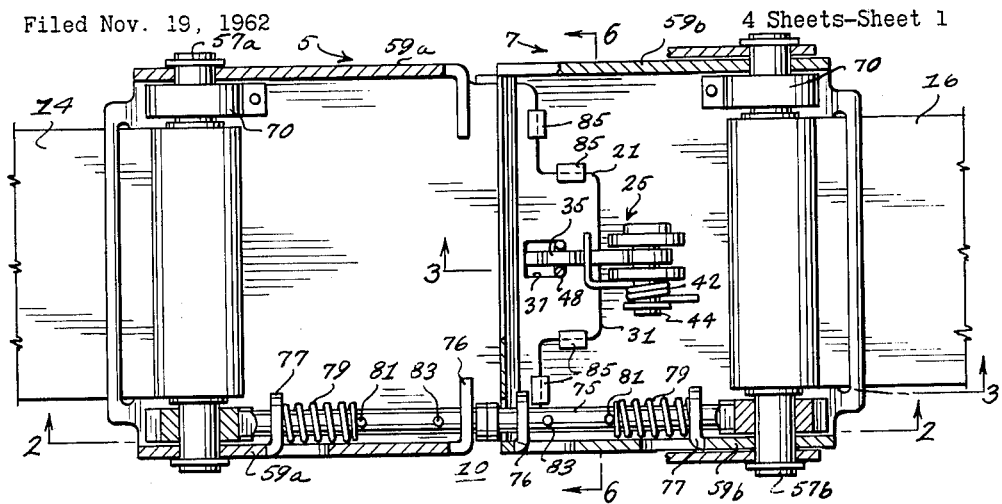
FIGURE 1 is a top plan view of the preferred embodiment of the buckle of the present invention. The top portion of the buckle housing has been removed to more clearly illustrate the interior construction of the buckle mechanism and portions of the buckle are shown in cross section.
Figure 2:
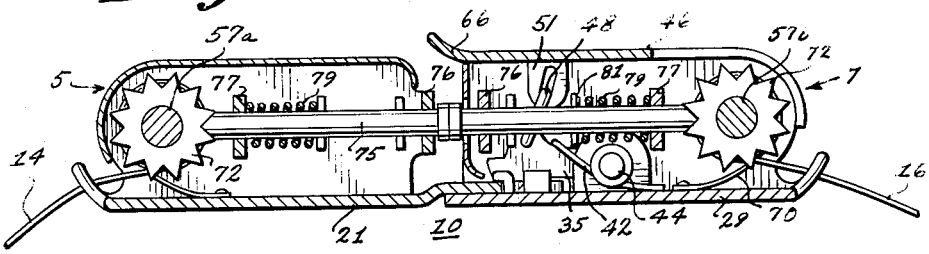
FIGURE 2 is a vertical cross sectional view of the buckle taken along lines 2—2 in FIGURE 1.
Figure 3:
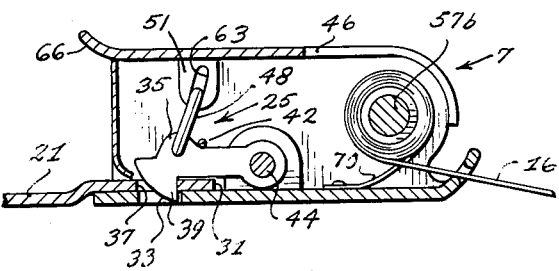
FIGURE 3 is a vertical cross sectional view of the latching portion of the buckle taken along lines 3—3 in FIGURE 1.
Figure 4:
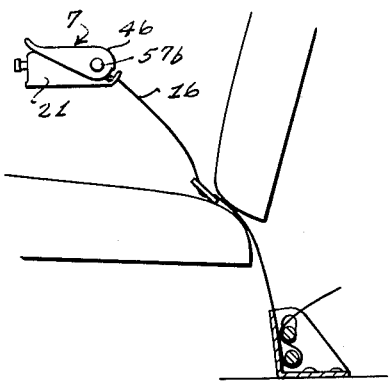
FIGURE 4 is a diagrammatic side elevation of an automobile seat showing how the belt and its attached buckle are attached to the vehicle.

Referring now to the drawings, and to FIGURES 1 and 2 particularly, the two halves 5 and 7 of a lap belt buckle 10 are illustrated as they interconnect the free ends of the belt sections 14 and 16 which form the safety harness. In connection with the actual inter-fastening operation of the buckle members, there is provided a tongue 21 which, by appropriate structure to be later explained, is attached to the left hand belt 14 and a cooperating latching mechanism 25 secured to the right hand belt 16. As a flat tongue 21 is inserted into the lower portion of the latching half 7 of the buckle, just above the base plate 29, the leading edge 31 of the tongue 21 reacts with an inclined surface 33 of the latching pawl 35 to raise or cam the pawl upwardly. When the locking aperture 37 in the tongue comes beneath the poised pawl hook 39 the biasing spring 42 pivots the pawl 35 on its mounting spindle 44 and forces the hook 39 into the tongue aperture 37, thus latching the tongue 21 to the latching half 7 of the buckle 10. The tongue may be removed from its latched position, thereby disconnecting the belt ends by raising the hook end of the pawl 35 out of the tongue aperture 37. The pawl 35 is rotated clockwise about it pivot 44 (referring to FIGURES 1 and 2) against the downward force of the pawl spring 42 by lifting the cover 46 which is connected to the pawl 35 through a C link 48. The ear 51 which interconnects the C link and the cover 46 is provided with a slot 63 to which the upper portion of the C link is hooked to accommodate the upward motion of the pawl 35 as it raises over the forward edge 31 of the sliding tongue 21. The pivoted cover 46 of the buckle latching member 7 is pivotally mounted on a transverse shaft 57b which is journalled in the upstanding sides 59b of the buckle housing, a lip 66 is formed at the forward end of the cover to facilitate gripping the cover to raise it against the force of the pawl biasing spring 42.

Although only one latch 25 has been illustrated, more may be provided if necessary to establish the proper criteria of safety. In fact, the specific latch structure shown and described may yield to other buckling mechanisms without departing from the spirit and scope of the invention, it being understood that the fundamental novelty of the invention resides in the belt take-up and storage means which will now be described.

Each of the buckle members 5 and 7 are equipped with a transverse shaft 57a and 57b respectively which are supported by the upstanding side walls 59a and 59b. To each of the shafts is connected the inner end of a coiled spring 70 which has its outer end anchored to the housing as for example the base plate 29 in the latching member 7. On each of the shafts 57a and 57b is wound the safety harness belt 14 and 16 respectively. As the belting is pulled from its reeled position, the shaft to which the end of the belt is firmly attached, rotates and winds the corresponding spring.

The shafts 57a and 57b are freely rotatable until the buckle members are joined and locked together, as shown in FIGURES 1 and 2. The belt must not be allowed to unreel from either buckle shaft once the buckles are fastened, otherwise the safety harness could not function to hold a person tightly in his seat. To accomplish this objective each of the spool shafts 57a and 57b is provided with a spur-type gear 72 rigidly fixed thereto so that the gear 72 rotates with its mounting shaft. A reciprocally movable push rod 75 is mounted in the plane of the gear 72 by a pair of struck-out bearing ears 76 and 77. The inner end of the push rod 75 is shaped to fit the interdental spaces of the spur gear 72 so that when it is thus positioned the gear and its shaft will be restrained from rotation. As seen in FIGURES 1 and 2, the push rods 75 are identical in both buckle halves 5 and 7 and are arranged to abut against each other in longitudinal alignment when the buckle halves are joined. Each of the push rods 75 is biased outwardly to an "unlock" position by a spiral co-axial rod mounted spring 79 which is placed between the inward rod-support-ear 77 and a stop pin 81 on the rod 75. As the buckle members are disengaged the spiral rod springs 79 force the push rods 75 out of their locking engagement with the shaft spur gears 72. A second stop pin 83 is fastened to the push rod 75 inwardly of the mounting ear 76 and acts to limit the outward travel of the push rod 75.

To insure proper alignment of the two opposing push rods during the mutual engagement of the buckle members, the base plate 29 of the latching member 7 is provided with a plurality of symmetrically positioned restraining guides 85 which insure proper longitudinal alignment of the buckle halves and which also maintain the two buckle members 5 and 7, fixed in the same plane.

Figure 5:
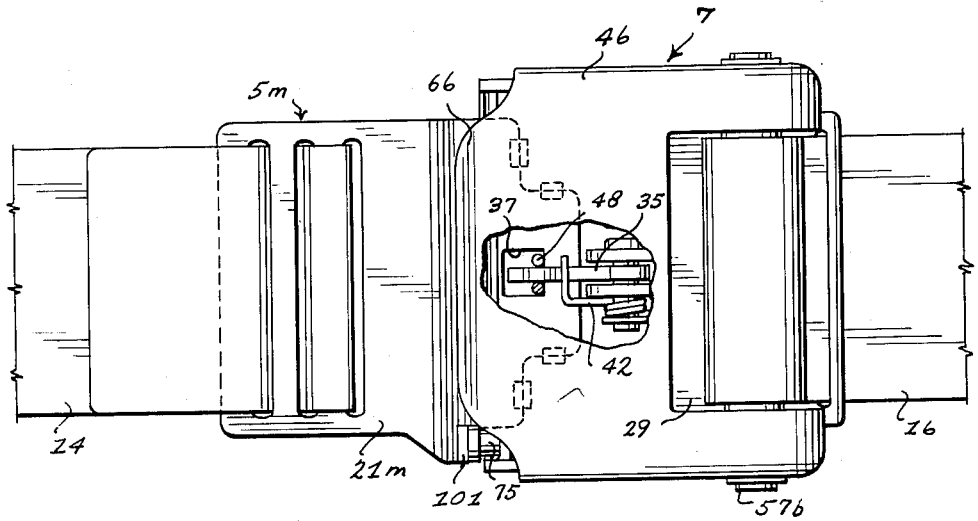
FIGURE 5 is a top plan view of a modified form of the buckle of the present invention wherein the latching member of the buckle means is the only portion thereof which is supplied with a belt take-up reel. A portion of the housing of the latching member is removed to clearly show the interior construction of the buckle and its cooperation with the tongue member.
Figure 6:
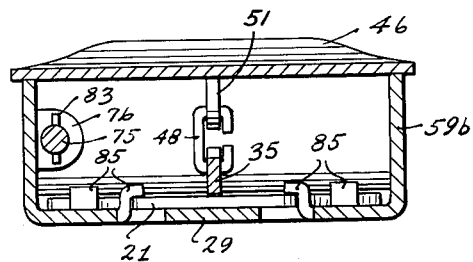
FIGURE 6 is a cross sectional view of the latching member of the buckle taken along lines 6—6 in FIGURE 1.
Figure 7:
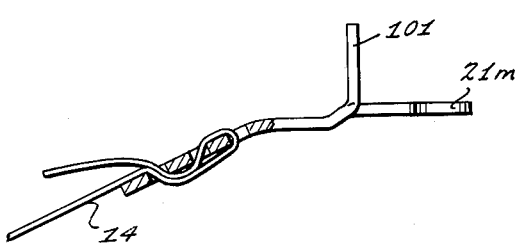
FIGURE 7 is a cross sectional view taken along the longitudinal center line of the buckle tongue of FIGURE 5.

As will be seen in FIGURES 5 and 7, the apparatus of the present invention lends itself to simplified modifications where only one of buckle halves 7 is equipped to reel-up and store excess belting. When preferred, the tongue 21M may be secured to the free end of the belt 14 as has been done in the prior art. An integrally formed upturned shoulder 101, normal to the plane of the tongue proper, abutts against the outward end of the push rod 75 in the latching member and depresses it into "locked" position when the tongue 21M is latched to the other buckle half 7.

Figure 8:
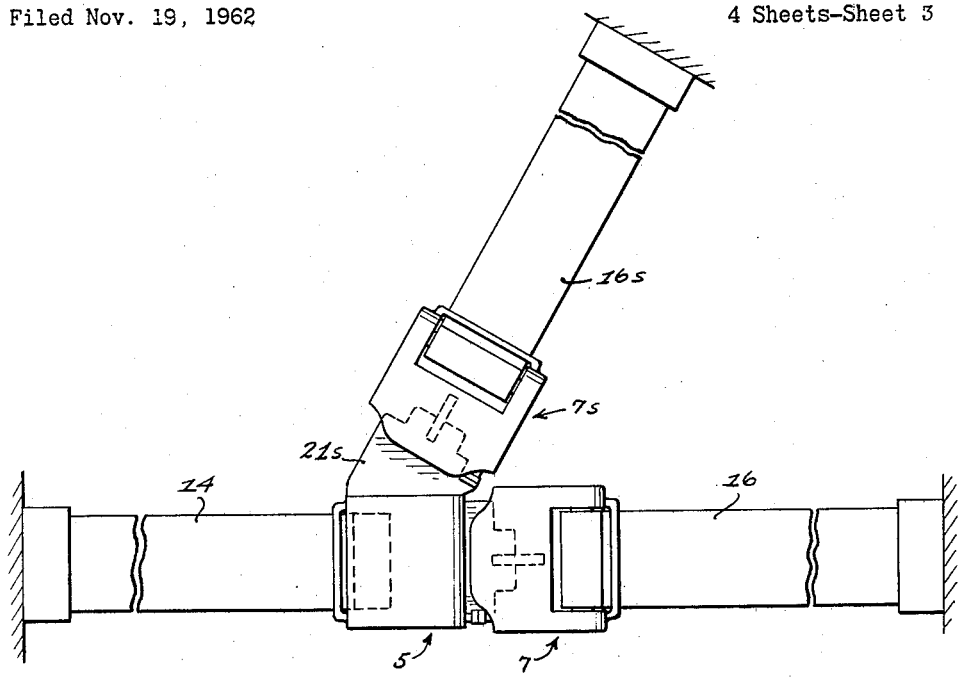
FIGURE 8 is a diagrammatic view of the buckle shown in FIGURE 1 which illustrates the addition of a second tongue member to accommodate the latching portion of a shoulder strap buckle.

To further the safety of vehicle passengers a shoulder strap may be used to restrain sudden forward movement of the upper body. Convenience and ease are also well served in a shoulder strap configuration utilizing the buckle of the present invention. An auxiliary tongue 21S for the shoulder strap connection is shown in FIGURE 8. Such an arrangement is similar in all respects to the embodiment shown in FIGURE 5 except that the tongue 21S is attached to one of the lap belt buckle halves.

Figure 9:
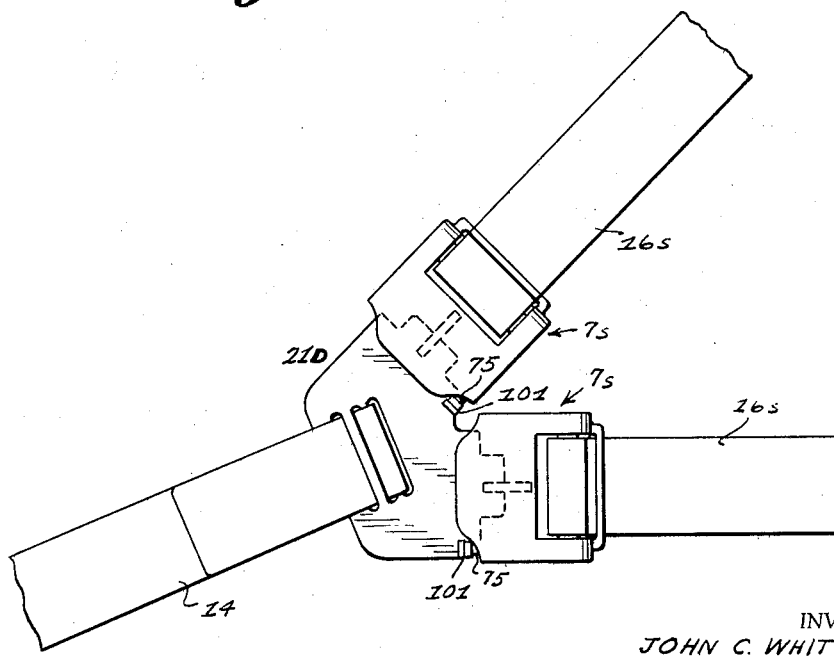
FIGURE 9 is a diagrammatic view depicting two latching members interconnected with one tongue member wherein each of the latching members is provided with a take-up reel.

An even further modification of the tongue member can be easily made to cooperate with two latching members 7S having take-up belt spools which must be locked when the buckle is fastened. It will be noted from FIGURE 9 that each of the dual portions of the tongue 21D is provided with an upstanding shoulder 101 which abutts and depresses the respective push rod 75.

Referring now to FIGURES 10 through 15, a brief explanation will be presented of possible alternative structures with which the objective may be achieved, that is to lock the belt storage reels against rotation coincidentally with the fastening together of the buckle members.

Figure 10:
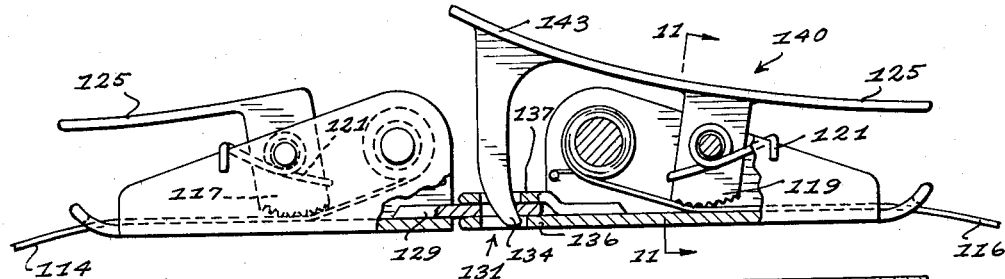
FIGURE 10 is a side elevational view of a still further modified form of the invention with portions thereof broken away and shown in cross section to more clearly illustrate the interior construction of the latching and tongue portions of the buckle.
Figure 11:
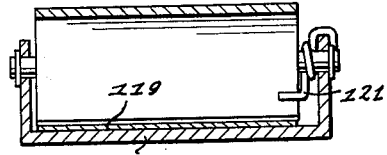
FIGURE 11 is a cross sectional view of the modified form shown in FIGURE 10 taken along lines 11—11.

In the structure of FIGURE 10 each of the belts 114 and 116 are wound upon a spring urged rotatable shaft from which they are pulled and upon which they are reeled when not in use. Each half of the buckle carries a pivotal spindle-mounted friction claw 117 and 119 which is strongly biased by a spring 121 into pinching engagement with the belt and the base plate of the buckle member so as to hold the belt and prevent its further movement relative to the buckle. A finger bar 125, integral with the friction claw, permits the claw to be rotated away from contact with the belt or at least into a position where the belt can be free to move. For example, in the buckle member attached to the left hand belt 114 the bar 125 is depressed, rotating the eccentric claw 117 counter-clockwise about its shaft. In the instant embodiment, each of the buckle halves is alike except for the presence of an apertured tongue 129 protruding from the one member and a corresponding mating and latch mechanism 131, carried by the other buckle member 140. The latch comprises a tooth 134 which is lowered into the aligned apertures of the sandwiched tongue 129 and a pair of spaced apart parallel plates 136 and 137 on the latching member 140 of the buckle. The tooth 134 depends from a forward extension 143 of the finger bar 125 and thus operates to latch the two buckle members, while at the same time locking the belt 116 against rotation.

Figure 12:
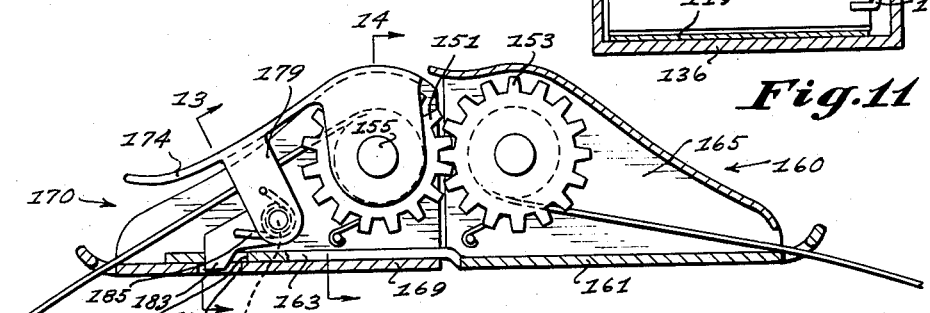
FIGURE 12 is a still further modification of the present invention showing an elevational side view thereof with portions broken away and shown in cross section.
Figures 13, 14:
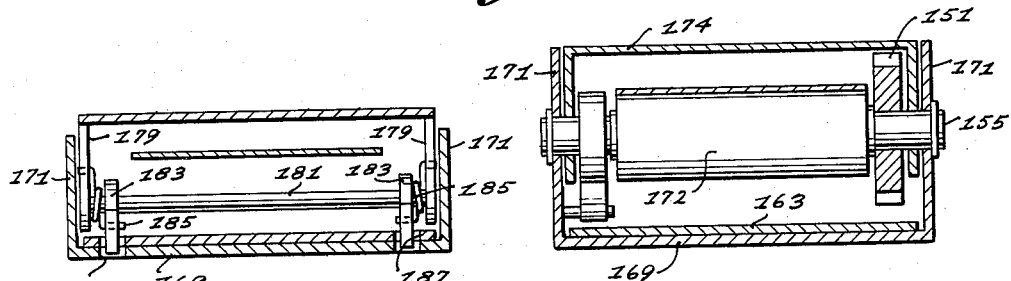
FIGURE 13 is a cross sectional view of the modification shown in FIGURE 12 taken along lines 13—13, in FIGURE 12.
FIGURE 14 is a cross sectional view of the modification shown in FIGURE 12 taken along lines 14—14 in FIGURE 12.

The buckle embodiment of FIGURE 12 utilizes a pair of counter rotating spur gears 151 and 153 mounted on the belt take-up spindles 155 and 157 to lock the spindles against rotation when the gear teeth are mutually engaged. The tongue member of the buckle 160 comprises a housing having a base member 161, longitudinally extended to form a tongue 163 and upstanding side bearing walls 165 which support the belt shaft 157. The latching member 170 includes a base plate 169 and upturned side bearing walls 171 which support the belt shaft 155. Also pivotally mounted on the shaft 155 astraddle the coiled belt 172 is a finger lever 174 which has depending therefrom on opposite sides thereof a pair of mounting ears 179 which carry a shaft 181. A pair of spring biased, spaced apart pawls 183 hang from the shaft and as the tongue 163 is projected inwardly into the interior of the buckle member 170 the pawls 183 are rotatably cammed upwardly about shaft 155 by the sliding tongue against the downwardly directed force of the pawl springs 185. As the tongue apertures 187 come beneath the pawl and over the base plate apertures 189, the pawls 183 drop into the aligned apertures and lock the two buckle members together. Simultaneously the spur gears 151 and 153 mesh and are thereby deprived of further rotation.

Figure 15:
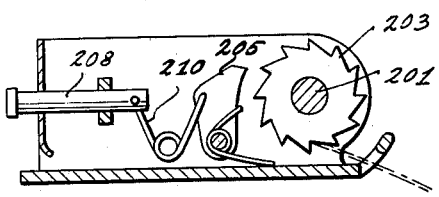
FIGURE 15 is a vertical cross sectional view of a modified form of latching element for locking the belt take-up reel against rotation.

One further form of the invention is diagrammatically shown in FIGURE 15. This form is similar to that of FIGURES 1 and 2 and hence is incompletely shown. In the embodiment of FIGURE 1 the belt reel cannot rotate in either direction once the halves are latched together. However, it may be desirable to tighten the belt after it is buckled and such an operation requires that the spool 201 reel-up the excess belting without allowing it to pay off of the reel. This objective is accomplished by replacing the rotatable spur gear with a toothed ratchet gear 203. A pivoted ratchet dog 205 engages the ratchet gear 203 as a result of inward motion of the push rod 208 and appropriate action of the spring linkages 210 as will be obvious to those skilled in the art.

Having thus described the several useful and novel features of the belt storing buckle of the present invention in connection with the accompanying drawings, it will be seen that the many worthwhile objectives for which it was designed have been achieved. Although several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claim.

I claim:

A web belt fastening buckle structure for retracting and storing unused belting, comprising in combination:
- a tongue member,
- a base having a latch member pivotally mounted on said base, fastening means carried at one end of the latch member for releasable locking engagement with said tongue,
- a friction cleat mounted on said latch member on the same side of the latch member as said fastening means for clamping a belt against the base,
- a rotatable spool means mounted on said base between said fastening means and said friction cleat, said spool means including means for fastening a belt end thereto and a belt fastened thereto,
- means operatively connected to the spool means and normally urging the spool means in one direction of rotation, and spring means operably connected to the friction cleat and normally urging the friction cleat into engagement with the belt whereby the belt is pinched between the friction cleat and the base.

References Cited by the Examiner

UNITED STATES PATENTS

| | | | |
|---|---|---|---|
| 1,569,699 | 1/1926 | Bergstrom | 242—107.2 |
| 2,338,385 | 1/1944 | Sorensen | 242—107.2 |
| 2,747,814 | 5/1956 | Taylor | 242—107.2 |
| 2,822,595 | 2/1958 | Rhul. | |
| 2,965,945 | 12/1960 | Lazich. | |

WILLIAM FELDMAN, *Primary Examiner.*

DONLEY J. STOCKING, BERNARD A. GELAK,
*Examiners.*